United States Patent
Meyer et al.

(10) Patent No.: US 9,695,892 B2
(45) Date of Patent: Jul. 4, 2017

(54) COMPRESSIBLE FILLER PIECE FOR A BRAKE CALLIPER OF A RAILWAY VEHICLE

(71) Applicant: ALSTOM TRANSPORT TECHNOLOGIES, Levallois Perret (FR)

(72) Inventors: Ulrich Meyer, Salzgitter (DE); Holger Kaufmann, Magdeburg (DE); Michael Kulp, Hüttenrode (DE)

(73) Assignee: ALSTROM TRANSPORT TECHNOLOGIES, Saint-Ouen (FR)

( * ) Notice: Subject to any disclaimer, the term of this patent is extended or adjusted under 35 U.S.C. 154(b) by 0 days.

(21) Appl. No.: 14/849,988

(22) Filed: Sep. 10, 2015

(65) Prior Publication Data

US 2016/0069405 A1 Mar. 10, 2016

(30) Foreign Application Priority Data

Sep. 10, 2014 (EP) ..................................... 14306395

(51) Int. Cl.
| | | |
|---|---|---|
| *F16D 65/00* | (2006.01) | |
| *B61H 9/00* | (2006.01) | |
| *B61H 5/00* | (2006.01) | |
| *B60T 17/22* | (2006.01) | |
| *F16D 55/00* | (2006.01) | |

(52) U.S. Cl.
CPC ........ *F16D 65/0037* (2013.01); *B60T 17/228* (2013.01); *B61H 5/00* (2013.01); *B61H 9/006* (2013.01); *F16D 65/0025* (2013.01); *F16D 65/0068* (2013.01); *F16D 65/0081* (2013.01); *F16D 2055/0008* (2013.01); *F16D 2055/0033* (2013.01); *F16D 2055/0037* (2013.01)

(58) Field of Classification Search
CPC .............. F16D 65/0025; F16D 65/005; F16D 65/0068; F16D 65/0081; F16D 2055/0016; F16D 2055/0037; F16D 2055/0041; F16D 65/097; F16D 65/0973; B61H 9/006; B61H 5/00; B60T 17/228
USPC ... 188/71.1, 72.1, 72.4, 72.9, 56, 58, 153 R, 188/153 D, 382
See application file for complete search history.

(56) References Cited

U.S. PATENT DOCUMENTS

| | | | | |
|---|---|---|---|---|
| 2,277,637 A | * | 3/1942 | Eby ......................... | F16G 11/04 16/2.2 |
| 2,467,356 A | * | 4/1949 | Eksergian ................. | B61F 5/36 188/152 |

(Continued)

FOREIGN PATENT DOCUMENTS

| | | |
|---|---|---|
| DE | 10102761 A1 | 7/2002 |
| FR | 2927974 A1 | 8/2009 |

(Continued)

OTHER PUBLICATIONS

Extended European Search Report dated Mar. 24, 2015 in corresponding application No. 14306395.6.

*Primary Examiner* — Thomas J Williams
(74) *Attorney, Agent, or Firm* — Knobbe Martens Olson & Bear LLP

(57) ABSTRACT

A compressible filler piece for a brake calliper of a railway vehicle is adapted to at least partially fill out a space needed by a component (409) of the brake calliper for its operation. The filler piece can be applied to the protection of wheel brakes of low floor passenger trains against ice and snow.

17 Claims, 8 Drawing Sheets

(56) References Cited

U.S. PATENT DOCUMENTS

| | | | |
|---|---|---|---|
| 2,713,923 A | 7/1955 | Eksergian et al. | |
| 2,893,761 A * | 7/1959 | Peat | B61F 15/22 |
| | | | 277/356 |
| 3,035,844 A * | 5/1962 | Bollinger, Sr. | B61F 15/22 |
| | | | 277/356 |
| 3,044,918 A * | 7/1962 | Wagner | B29C 44/12 |
| | | | 156/160 |
| 3,207,522 A * | 9/1965 | Gorcyca | B61F 15/22 |
| | | | 277/356 |
| 4,360,083 A | 11/1982 | Weisman | |
| 5,088,580 A * | 2/1992 | Grothe | F16F 13/18 |
| | | | 188/298 |
| 8,365,876 B2 * | 2/2013 | Mazur | B60T 7/18 |
| | | | 188/298 |
| 2008/0012188 A1 * | 1/2008 | Dickson | F16F 1/3732 |
| | | | 267/139 |
| 2012/0292138 A1 * | 11/2012 | Ebner | F16D 65/567 |
| | | | 188/71.7 |

FOREIGN PATENT DOCUMENTS

| | | | | |
|---|---|---|---|---|
| FR | 2988451 A1 | 9/2013 | | |
| GB | 683673 A | 12/1952 | | |
| GB | 986972 A | 3/1965 | | |
| GB | 1053856 A | 1/1967 | | |
| HU | DE 3320035 A1 * | 1/1984 | | B60D 5/003 |
| JP | 2005024054 A * | 1/2005 | | |

* cited by examiner

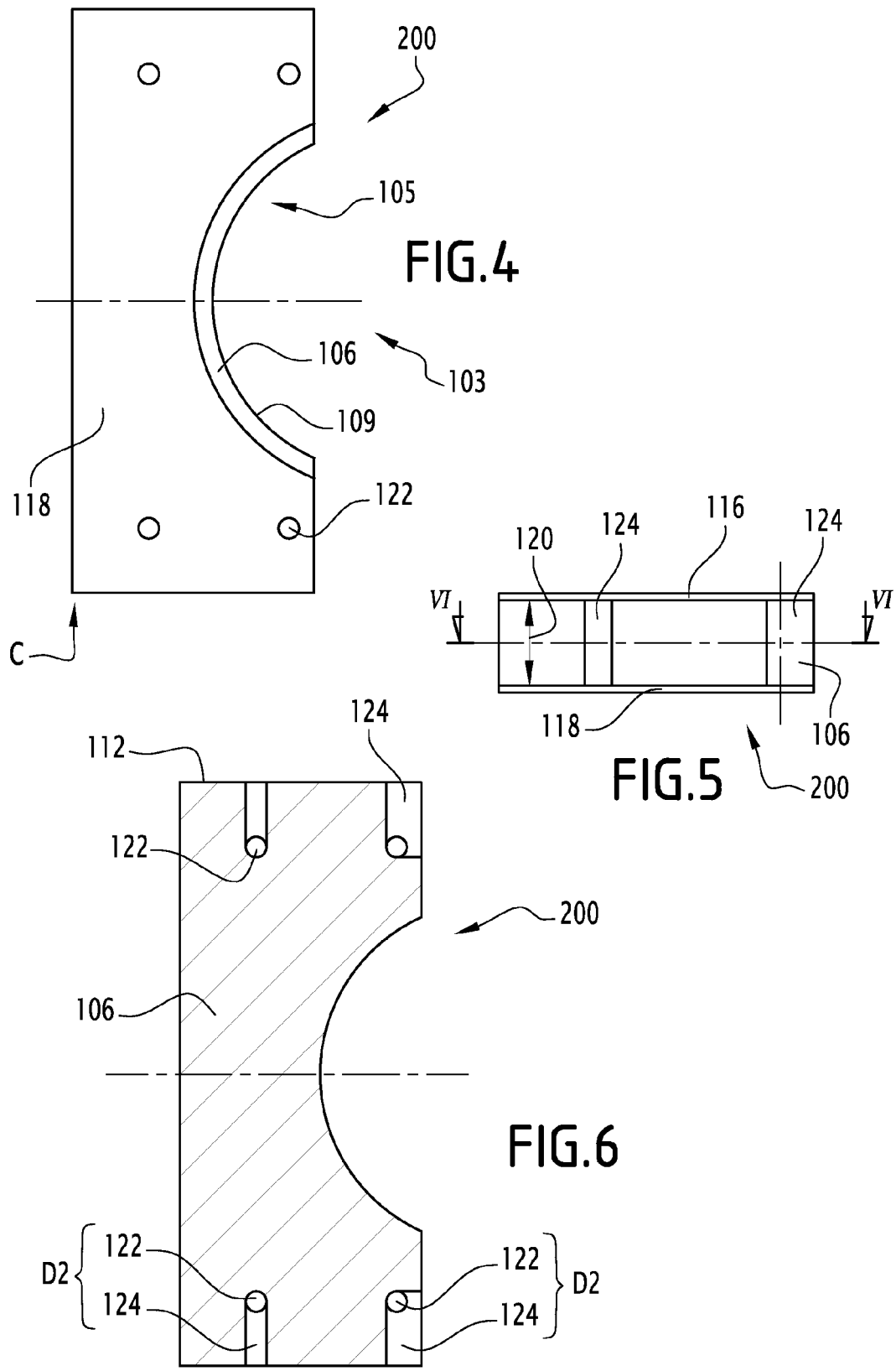

COMPRESSIBLE FILLER PIECE FOR A BRAKE CALLIPER OF A RAILWAY VEHICLE

CROSS-REFERENCE TO RELATED APPLICATIONS

This application claims priority to European Patent Application No. 14306395.6, filed on Sep. 10, 2014, the disclosure of which including the specification, the drawings, and the claims is hereby incorporated by reference in its entirety.

FIELD OF INVENTION

The present invention relates to the protection of wheel brakes of railway vehicles, and in particular their brake callipers against ice and snow.

BACKGROUND OF THE INVENTION

Railway vehicles operating in northern Europe (e.g. in Scandinavia) are exposed to extreme weather conditions during winter. They have to be designed to withstand substantial amounts of ice and snow. The proper operation of the brake callipers of such railway vehicles in particular must not be jeopardized by the presence of ice or snow.

The freight trains that have traditionally been used in northern Europe have their brake callipers arranged with ample free space around them to ensure their reliable operation. Thanks to the free space, no operation impeding ice or snow can accumulate on the brake callipers.

However, nowadays, passenger trains are more and more common in northern Europe. Passenger trains travel at higher speeds than freight trains, which leads to more snow and ice accumulation on the train components. Also, modern low floor passenger trains such as the Coradia Nordic X62 manufactured by the Applicant have little room around their brake callipers on their bogies.

Due to the compact design of the bogies and the wheel brakes of these modern passenger trains, snow and ice can easily accumulate in the relatively small gaps between the brake calliper components. The accumulated snow and ice can interfere with the movement of the brake calliper components and lead to a failure of the brake.

One way to avoid this ice or snow accumulation is to heat the entire bogie. This solution consumes however a lot of energy. Another option is a regular and preventive de-icing of the bogies in dedicated depots. This is however undesirable since it reduces the running time of the train.

SUMMARY OF THE INVENTION

It is therefore an object of the present invention to provide a simple and cheap way of ensuring the reliable operation of the brake callipers of a railway vehicle under icy and snowy conditions over a long period of time.

According to the invention, this object is achieved with a compressible filler piece for a brake calliper of a railway vehicle adapted to at least partially fill out a space provided for a component of the brake calliper for its operation.

The inventive filler piece is used to occupy free spaces next to movable components of the brake calliper. Since the free space is taken up by the filler piece, neither snow nor ice can accumulate. The brake calliper still functions properly because, thanks to its compressibility, the filler piece does not impede the movement of the brake calliper components.

The inventive filler piece may additionally include one, several or all of the following features, in all technically feasible combinations:
  the filler piece comprises a compressible, preferably waterproof core,
  the core comprises foam, such as polyethylene foam or polyurethane foam, the foam preferably being a closed-cell foam,
  the filler piece comprises a, preferably rigid, protective cover, the protective cover preferably comprising polyethylene or polyamide,
  the protective cover has at least one clearance allowing the compression of the filler piece,
  the protective cover includes two different plates,
  the filler piece comprises at least one filler piece fixing device for fixing the filler piece to the brake calliper,
  the filler piece fixing device comprises:
    a) a hole formed in the filler piece for receiving a fastener, such as a tie; and/or
    b) a cut-out and an associated eyelet both formed in the filler piece for receiving a fastener, such as a bolt,
  the filler piece is made of at least two mounting parts, the filler piece being adapted to be disassembled into said mounting parts to facilitate its fastening to the brake calliper,
  the filler piece comprises a seat for accommodating a brake cylinder bellows, said seat preferably having a curved wall, in particular a circular or a circular arc shaped wall.

Furthermore, the invention also pertains to a brake calliper for a railway vehicle comprising at least one filler piece as defined above.

According to preferred embodiments, the inventive brake calliper includes one, several or all of the following features, in all technically feasible combinations:
  it comprises a bridge piece with a fastening member for fastening the brake calliper to the railway vehicle, a brake lever arrangement having two brake levers pivotably joined to the bridge piece, and a brake cylinder arranged between respective ends of the brake levers and adapted to actuate the brake levers,
  one filler piece is arranged between one of the brake levers and the brake cylinder,
  one filler piece is arranged between one of the brake levers and the fastening member.

The present invention also relates to the use of a filler piece as defined above to protect a brake calliper of a railway vehicle, in particular the brake calliper as defined above, against ice or snow.

BRIEF DESCRIPTION OF THE DRAWINGS

Exemplary embodiments of the invention will now be described in detail with reference to the appended drawings, wherein:

FIGS. 4 to 6 are a front, top and cross-sectional view, respectively of a parking brake cylinder filler piece according to the invention;

DETAILED DESCRIPTION OF PREFERRED EMBODIMENTS

Figure 1:
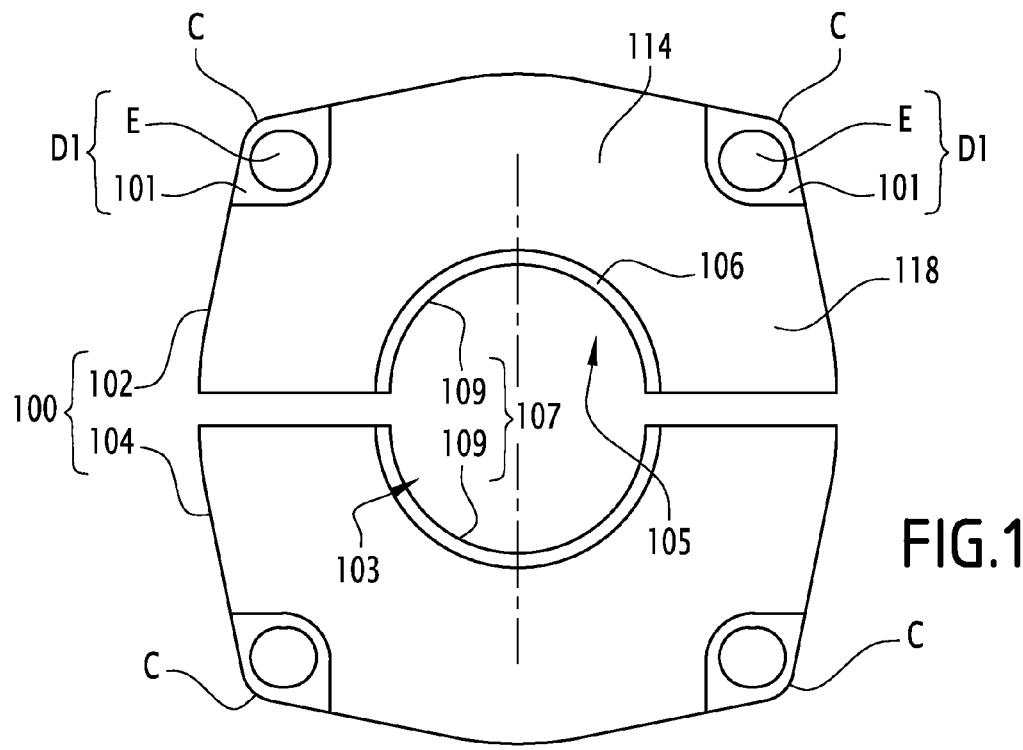
FIGS. 1 to 3 are a front, top and cross-sectional view, respectively of a service brake cylinder filler piece according to the invention.
Figure 2:
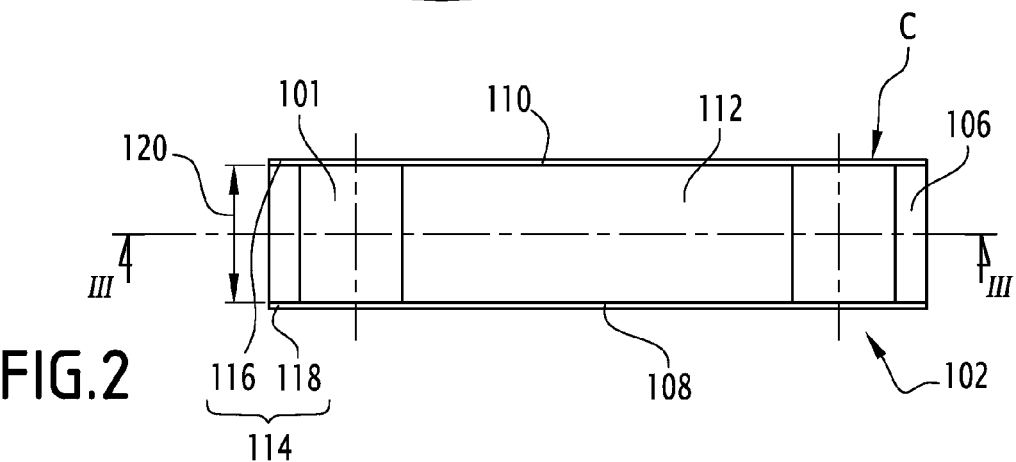
Figure 3:
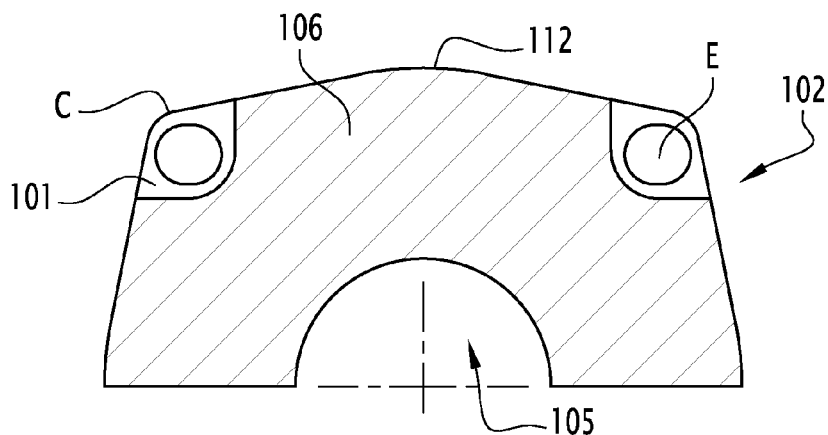

FIGS. 1 to 3 show a first embodiment 100 of a compressible filler piece of the invention. This service brake cylinder filler piece 100 is designed to fill the space next to the brake cylinder of a service brake calliper.

Service brake cylinder filler piece 100 is a generally square shaped disk with four corners C. Each corner C includes a filler piece fixing device D1 for fixing the service brake cylinder filler piece 100 to a service brake cylinder. Each filler piece fixing device D1 comprises a cut-out 101 adapted to let through a fastener, such as a bolt. Each filler piece fixing device D1 also comprises an eyelet E for receiving the same fastener.

The service brake cylinder filler piece 100 is made of two mounting parts 102, 104. Preferably, the two mounting parts are separable filler piece halves, namely an upper filler piece half 102 and lower filler piece half 104. In the mounted state of the service brake cylinder filler piece 100, the two filler piece halves 102, 104 abut against each other. The two filler piece halves 102, 104 are identical.

A seat 103 for accommodating a brake cylinder bellows is provided in the centre of service brake cylinder filler piece 100. Seat 103 is a circular hole, which is bounded by a circular wall 107.

In the following, only the upper filler piece half 102 will be described, this description also applying to the lower filler piece half 104.

Upper filler piece half 102 has a generally trapezoidal outer shape. It comprises a recess 105. Recess 105 is bounded by a semi-circular shaped wall 109. Recess 105 corresponds to the upper half of seat 103.

Upper filler piece half 102 has a compressible foam core 106 shown in FIGS. 2 and 3. The preferred materials for the foam core 106 are polyethylene foam or polyurethane foam, in particular PE PF 521. Other materials can be used for the core, as long as the core remains compressible. It is preferred that the foam core 106 be waterproof so that the lifetime of the filler piece 100 is increased. Closed-cell foam for the core 106 is particularly advantageous since it prevents the ingress of water into the core 106.

Foam core 106 has a back face 108, a front face 110, and an edge 112 connecting the back face 108 to the front face 110.

A protective cover 114 consisting of a front plate 116 and a back plate 118 partially surrounds foam core 106. More precisely, front plate 116 is attached to the foam core's front face 110, and back plate 118 is attached to the foam core's back face 108, such that the foam core 106 is sandwiched between the front plate 116 and the back plate 118. Preferably, the plates 116, 118 each have a thickness of a few millimeters.

The foam core's edge 112 is exposed to the surroundings via an annular clearance 120 between the two plates 116 and 118. Clearance 120 allows the compression of upper filler piece half 102.

Two of the filler piece's eyelets E are formed in corners of front plate 116.

Protective cover 114 is preferably made of a plastic material such as polyamide PA 6 or high density polyethylene HDPE 1000.

FIGS. 4 to 6 show a second embodiment 200 of a compressible filler piece of the invention. This parking brake cylinder filler piece 200 is designed to fill the space next to the brake cylinder of a parking brake calliper.

The elements of parking brake cylinder filler piece 200 that are identical to elements of service brake cylinder filler piece 100 are identified with the same reference number. In the following, only the differences of parking brake cylinder filler piece 200 with respect to service brake cylinder filler piece 100 will be described. Regarding similar elements, reference is made to the above description of service brake cylinder filler piece 100.

In parking brake cylinder filler piece 200, the brake cylinder seat 103 consists of a recess 105 bounded by a circular arc shaped wall 109. Parking brake cylinder filler piece 200 features four filler piece fixing devices D2 for fixing the parking brake cylinder filler piece 200 to a parking brake calliper. Each filler piece fixing device D2 consists of a through hole 122 and an associated groove 124. Each through hole 122 extends from the back plate 118 through the foam core 106 to the front plate 116. Each groove 124 starts from the filler piece's edge 112, extends into the foam core 106 and ends at the height of the corresponding through hole 122. Each groove 124 is sandwiched between the front plate 116 and the back plate 118.

Figure 7:
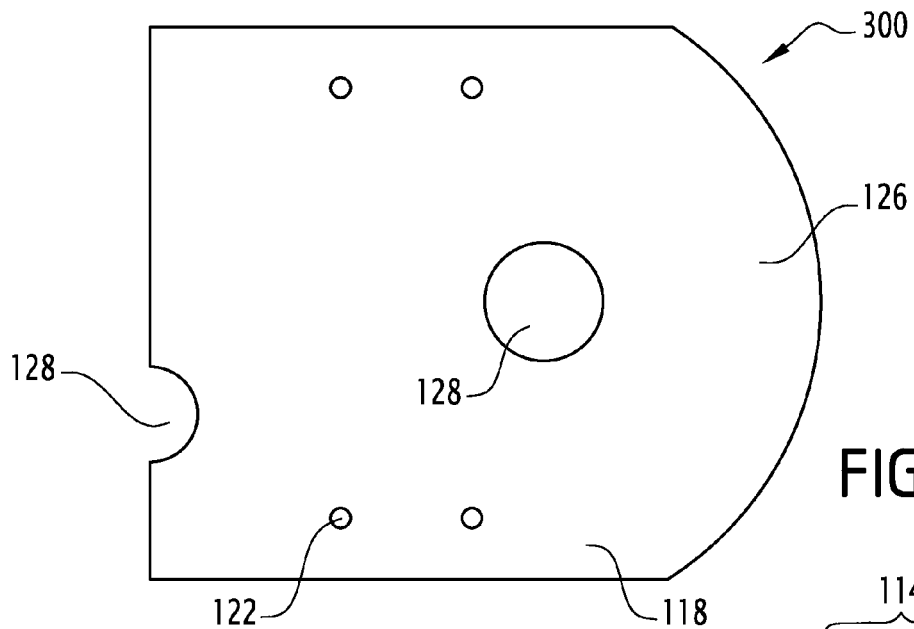
FIGS. 7 to 9 are a front, top and cross-sectional view, respectively of a bogie frame filler piece according to the invention.
Figure 8:
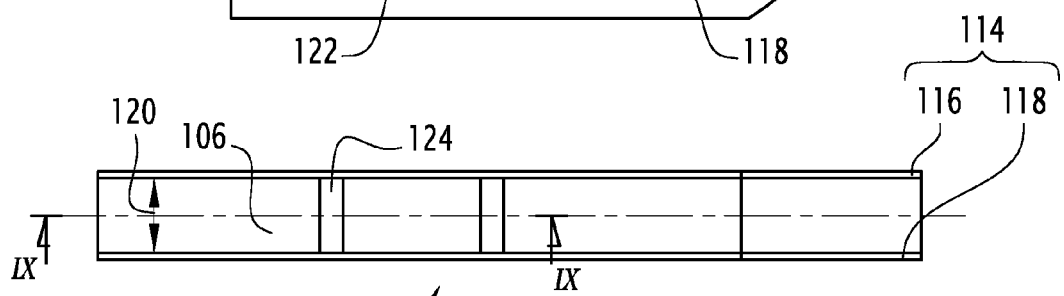
Figure 9:
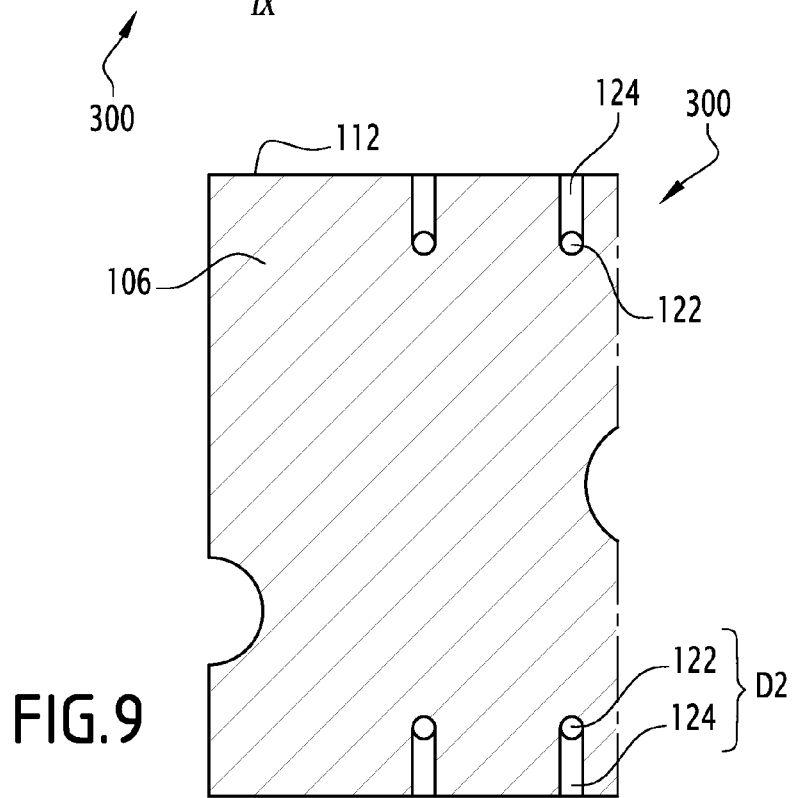

FIGS. 7 to 9 show a third embodiment 300 of a compressible filler piece of the invention. This bogie frame filler piece 300 is designed to fill the space between the inner brake lever of a brake calliper and the bogie frame to which the brake calliper is attached.

The elements of bogie frame filler piece 300 that are identical to elements of filler piece 100 or 200 are identified with the same reference number. In the following, only the differences of bogie frame filler piece 300 with respect to filler piece 100 or 200 will be described. Regarding similar elements, reference is made to the above description of filler pieces 100 and 200.

Bogie frame filler piece 300 includes a peripheral convex portion 126. This convex portion 126 is designed to fill out as much space as possible between the inner brake lever and the bogie frame without interfering with brake pipes and tubes in view of an easy installation. One or more apertures 128 may be pierced through bogie frame filler piece 300 to allow access to components of the brake calliper when bogie frame filler piece 300 is mounted thereto.

The attachment of the three types of filler pieces 100, 200 and 300 to a brake calliper will now be described with reference to FIGS. 10 to 12.

Figure 10:
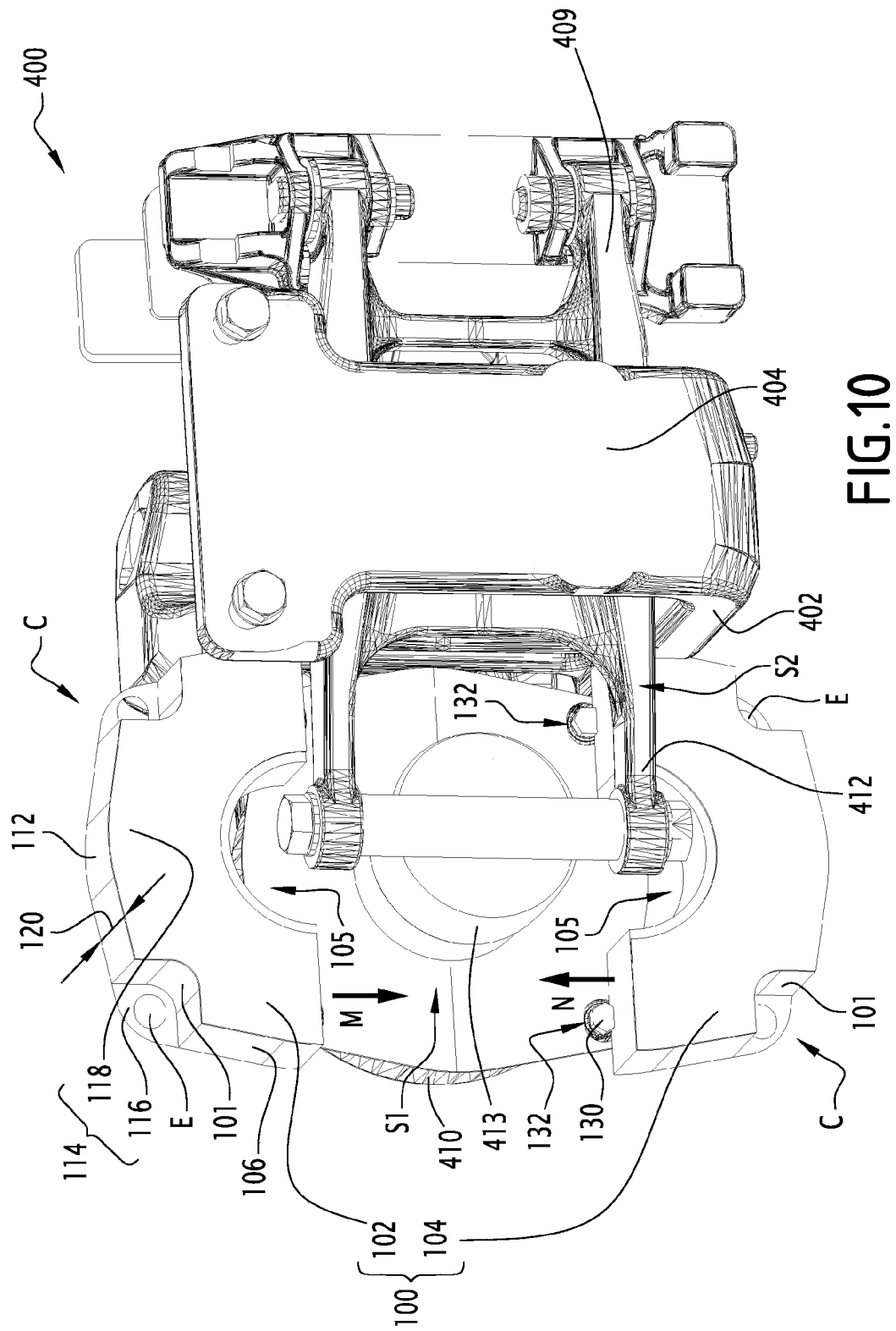
FIG. 10 is a perspective rear view of an inventive service brake calliper, with the service brake cylinder filler piece of FIGS. 1 to 3.

FIG. 10 illustrates how service brake cylinder filler piece 100 is fastened to a service brake calliper 400.

Service brake calliper 400 comprises:
a) a bridge piece 402 with a fastening member 404 for fastening the brake calliper 400 to the bogie frame of a railway vehicle;
b) a brake lever arrangement 406 having an outer brake lever 408 and an inner brake lever 409 pivotably joined to the bridge piece 402; and;

c) a brake cylinder 410 arranged between respective rear ends 412 of the brake levers 408, 409 and adapted to actuate the brake levers 408, 409.

A brake cylinder bellows 413 is located next to brake cylinder 410.

A first open space S1 is defined between the rear end 412 of the inner brake lever 409 and the brake cylinder 410. A second open space S2 is defined between the rear end 412 of inner brake lever 409 and the fastening member 404. Both open spaces S1 and S2 are provided for the movement of the brake levers 408, 409 during braking.

Upper filler piece half 102 is inserted from above in between the rear ends 412 of brake levers 408, 409, as indicated by arrow M, until recess 105 borders brake cylinder bellows 413. Then, bolts 130 (cf. FIG. 11) are passed through cut-outs 101 and eyelets E and screwed into internal threads present in brake cylinder 410, thus fastening upper filler piece half 102 to brake cylinder 410.

Likewise, lower filler piece half 104 is inserted from below in between the rear ends 412 of brake levers 408, 409, as indicated by arrow N, until recess 105 borders brake cylinder bellows 413. Then, bolts 130 are passed through cut-outs 101 and eyelets E and screwed into internal threads 132 present in brake cylinder 410, thus fastening lower filler piece half 104 to brake cylinder 410.

Figure 11:
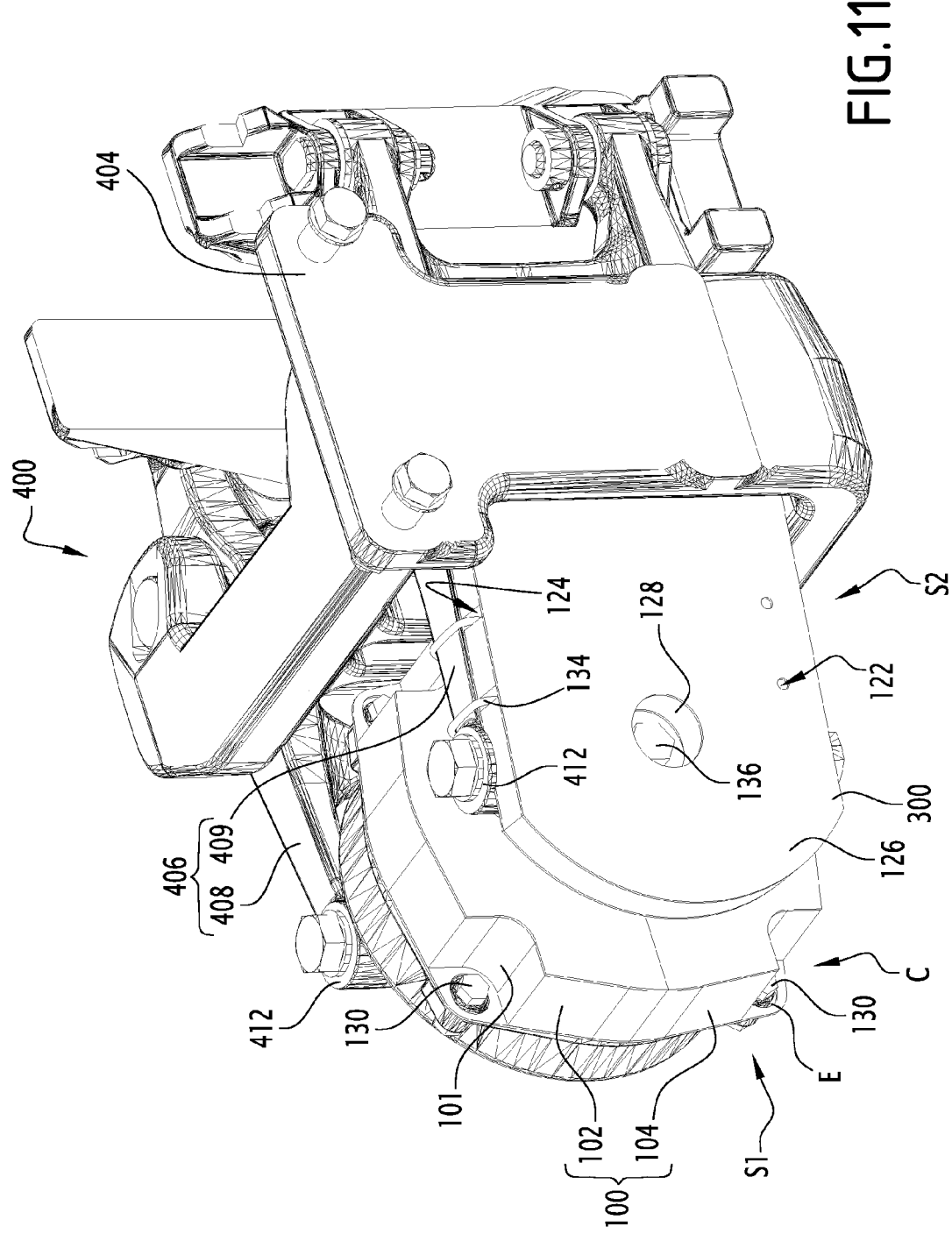
FIG. 11 is a perspective view of the service brake calliper of FIG. 10, with the service brake cylinder filler piece in a mounted state, and the bogie frame filler piece of FIGS. 7 to 9.

The result is shown in FIG. 11, which illustrates service brake cylinder filler piece 100 in its mounted state, where the two filler piece halves 102, 104 abut against each other. In this state, service brake cylinder filler piece 100 is arranged in open space S1 between the rear end 412 of inner brake lever 409 and brake cylinder 410. The thickness of service brake cylinder filler piece 100 is chosen such that it is substantially equal to the distance between the rear end 412 of inner brake lever 409 and brake cylinder 410 in the non-braking state of service brake calliper 400. Accordingly, service brake cylinder filler piece 100 fully takes up space S1.

FIG. 11 also shows bogie frame filler piece 300 in its mounted state where it is arranged in open space S2 between the inner brake lever 409 and the fastening member 404. Bogie frame filler piece 300 is attached to the inner brake lever 409 via four metal cable ties 134 that are each threaded through one groove 124 and one end of the associated through hole 122. Alternatively, bogie frame filler piece 300 may also be fixed to inner brake lever 409 via clamps instead of cable ties. The aperture 128 of bogie frame filler piece 300 permits access to a fastener 136 of service brake calliper 400. Bogie frame filler piece 300 only partially takes up space S2 (cf. FIG. 12).

Figure 12:
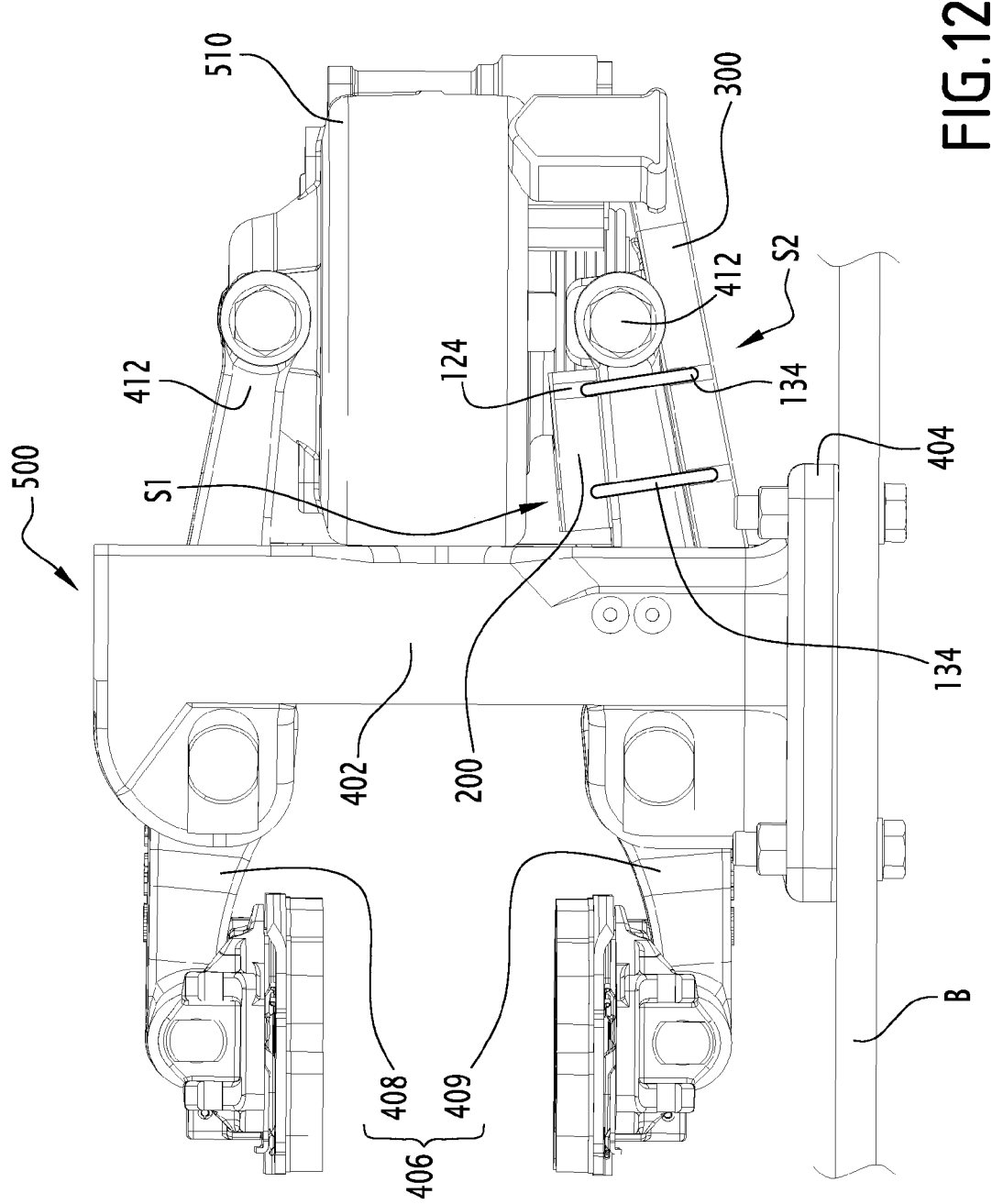
FIG. 12 is a top view of an inventive parking brake calliper, with the parking brake cylinder filler piece of FIGS. 4 to 6 and the bogie frame filler piece of FIGS. 7 to 9.

FIG. 12 shows a parking brake calliper 500. Parking brake calliper 500 is different from service brake calliper 400 in that it has a brake cylinder 510 that additionally includes a parking brake function. This means that, in contrast to service brake calliper 400, parking brake calliper 500 can be used to immobilise a parked railway vehicle that has been powered down. Apart from this difference, parking brake calliper 500 is identical to service brake calliper 400.

Parking brake cylinder filler piece 200 is used with parking brake calliper 500 instead of service brake cylinder filler piece 100. Indeed, parking brake cylinder filler piece 200 is adapted to the larger parking brake cylinder 510 of parking brake calliper 500. Parking brake cylinder filler piece 200 is attached via cable ties 134 or clamps (not shown) to the rear end 412 of inner brake lever 409. Parking brake cylinder filler piece 200 is arranged in open space S1 between the rear end 412 of the inner brake lever 409 and the parking brake cylinder 510. Parking brake cylinder filler piece 200 partially fills out space S1.

As in FIG. 11, a bogie frame filler piece 300 is attached with cable ties 134 to the rear end 412 of inner brake lever 409, opposite parking brake cylinder filler piece 200. Bogie frame filler piece 300 is arranged in open space S2 between the inner brake lever 409 and the fastening member 404.

As apparent from FIG. 12, the cable ties 134 are preferably threaded through both the parking brake cylinder filler piece 200 and the bogie frame filler piece 300 to fasten the filler pieces 200, 300 to the rear end 412 of inner brake lever 409.

Reference sign B identifies the bogie frame to which parking brake calliper 500 is attached via fastening member 404.

Thanks to the filler pieces 100, 200 and 300, formerly open spaces S1, S2 are partially or fully closed. This means that ice or snow can no longer block these spaces S1, S2 and impede the operation of the brake calliper 400, 500. The filler pieces 100, 200 and 300 themselves do not interfere with the brake calliper's operation. Indeed, despite the presence of filler pieces 100, 200, 300, the brake levers 408, 409 can still carry out their necessary movements during braking.

Under winter conditions, i.e. when brake calliper 400, 500 is covered in ice or snow, filler pieces 100, 200, 300 maintain a minimum working space for inner brake lever 409. Inner brake lever 409 can still pivot by compressing the filler pieces 100, 200, 300 against the ice or snow.

In the absence of ice or snow, inner brake lever 409 simply uses the remaining free parts of spaces S1 and/or S2 for its movement and does not exert any compressive force on filler pieces 100, 200, 300.

The filler pieces' plastic plates 116, 118 protect the foam core 106 from being damaged e.g. by flying gravel. Additionally, the plastic plates 116, 118 ensure the filler pieces' rigidity needed for fastening the filler pieces 100, 200, 300 to the brake calliper.

Figure 13:
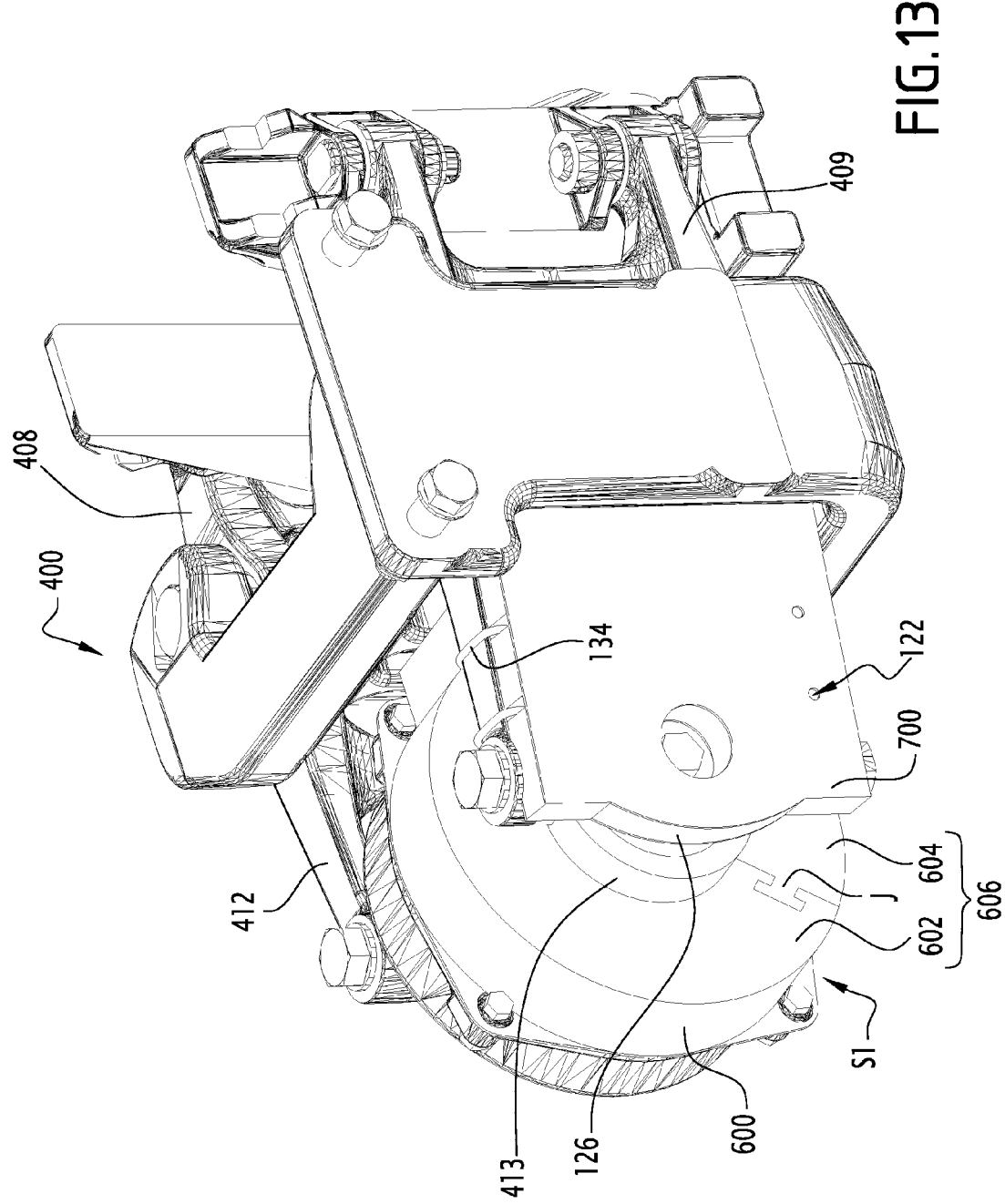
FIG. 13 is a perspective rear view of an inventive service brake calliper, with two further variants of the filler piece of the present invention.

FIG. 13 shows two further filler piece variants 600 and 700 of the present invention for a service brake calliper 400.

Filler piece 600 is made only of an annular foam core 606 with two filler piece halves 602 and 604 wrapped around the bellows 413. Filler piece halves 602 and 604 are interlocked via a dovetail joint J. Filler piece 600 is arranged in open space S1 between the rear end 412 of inner brake lever 409 and service brake cylinder 410. In an alternative embodiment, filler piece 600 is made of one integral annular piece that can be opened and closed via a dovetail joint.

Filler piece 700 is very similar to bogie frame filler piece 300 and mounted at the same position on service brake calliper 400. The only difference is a slightly modified convex portion 126.

Figure 14:
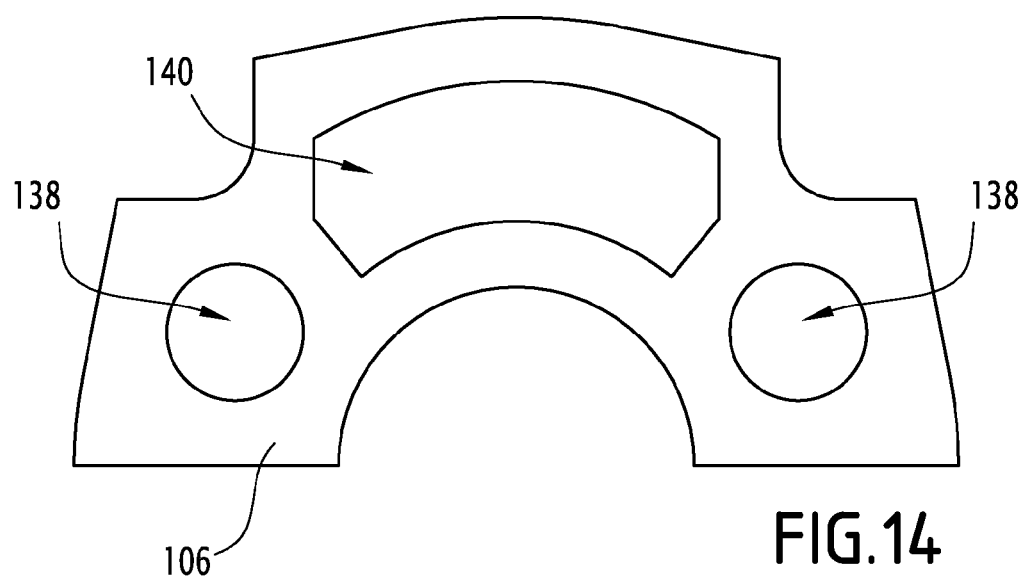
FIGS. 14 and 15 are front elevational views of two variants of filler piece foam cores according to the present invention.

FIG. 14 shows a variant of the foam core 106 of filler piece halves 102, 104 of service brake cylinder filler piece 100. This foam core 106 has two lateral circular clearances 138 and an arcuate central clearance 140.

Figure 15:
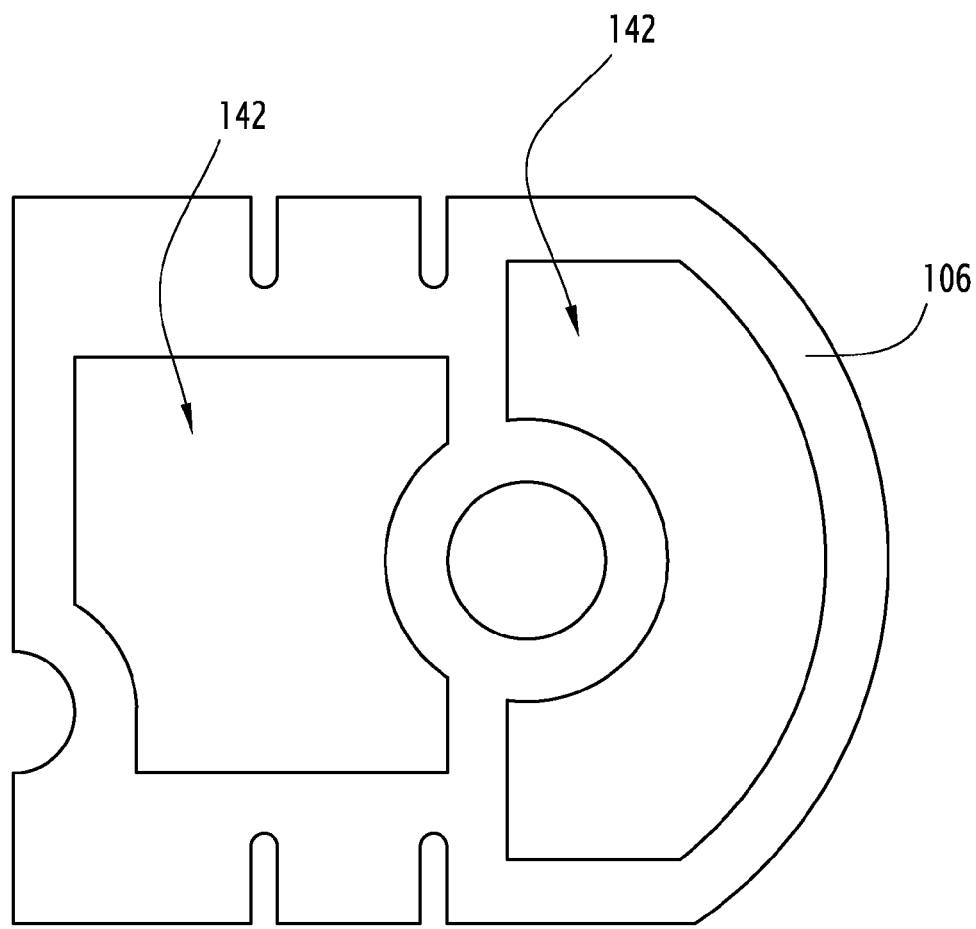

Likewise, FIG. 15 shows a variant of the foam core 106 of bogie frame filler piece 300. This foam core 106 has two clearances 142.

Thanks to the clearances 138, 140, 142, the foam cores' compressibility is increased.

The filler pieces according to the invention can be easily retrofitted to existing railway vehicles without having to disassemble the brake callipers. The inventive filler pieces do not consume any energy and can be implemented in modern low floor passenger trains.

What is claimed is:

1. A brake caliper for a railway vehicle comprising:
   at least one compressible slice-shaped filler piece adapted to at least partially fill out a space provided for a component of the brake caliper for its operation;
   a bridge piece with a fastening member for fastening the brake caliper to the railway vehicle;
   a brake lever arrangement having two brake levers pivotably joined to the bridge piece; and
   a brake cylinder arranged between respective ends of the brake levers and adapted to actuate the brake levers,
   wherein the at least one compressible slice-shaped filler piece is arranged between one of the brake levers and the fastening member and/or the at least one compressible slice-shaped filler piece is arranged between one of the brake levers and the brake cylinder.

2. The brake caliper of claim 1, wherein the filler piece comprises a compressible core.

3. The brake caliper of claim 2, wherein the compressible core is waterproof.

4. The brake caliper of claim 2, wherein the core comprises foam.

5. The brake caliper of claim 4, wherein the foam is polyethylene foam or polyurethane foam.

6. The brake caliper of claim 1, wherein the filler piece comprises a protective cover.

7. The brake caliper of claim 6, the protective cover comprising polyethylene or polyamide.

8. The brake caliper of claim 6, wherein the protective cover has at least one clearance allowing the compression of the filler piece.

9. The brake caliper of claim 6, wherein the protective cover includes two different plates.

10. The brake caliper of claim 1, wherein the filler piece comprises at least one filler piece fixing device for fixing the filler piece to the brake caliper.

11. The brake caliper of claim 10, wherein the filler piece fixing device comprises:
    a) a hole formed in the filler piece for receiving a fastener; and/or
    b) a cut-out and an associated eyelet both formed in the filler piece for receiving a fastener.

12. The brake caliper of claim 1, wherein the filler piece is made of at least two mounting parts, the filler piece being adapted to be disassembled into said mounting parts to facilitate its fastening to the brake caliper.

13. The brake caliper of claim 1, wherein the filler piece comprises a seat for accommodating a brake cylinder bellows.

14. The brake caliper of claim 13, said seat having a curved wall.

15. The brake caliper of claim 14, said curved wall being a circular or a circular arc shaped wall.

16. A method for protecting a brake caliper of a railway vehicle against ice or snow comprising:
    providing the at least one compressible slice-shaped filler piece according to claim 1.

17. A brake caliper for a railway vehicle comprising
    at least one compressible slice-shaped filler piece adapted to at least partially fill out a space provided for a component of the brake caliper for its operation;
    a bridge piece with a fastening member for fastening the brake caliper to the railway vehicle;
    a brake lever arrangement having two brake levers pivotably joined to the bridge piece; and
    a brake cylinder arranged between respective ends of the brake levers and adapted to actuate the brake levers,
    wherein the at least one compressible slice-shaped filler piece is arranged between one of the brake levers and the fastening member.

* * * * *